US012603215B2

(12) United States Patent
Wang

(10) Patent No.: US 12,603,215 B2
(45) Date of Patent: Apr. 14, 2026

(54) ELECTRIC CONTROL BOX ASSEMBLY AND WINDOW AIR CONDITIONER

(71) Applicants: GD MIDEA AIR-CONDITIONING EQUIPMENT CO., LTD., Foshan (CN); MIDEA GROUP CO., LTD., Foshan (CN)

(72) Inventor: Kezhi Wang, Foshan (CN)

(73) Assignees: GD MIDEA AIR-CONDITIONING EQUIPMENT CO., LTD., Foshan (CN); MIDEA GROUP CO., LTD., Foshan (CN)

(*) Notice: Subject to any disclaimer, the term of this patent is extended or adjusted under 35 U.S.C. 154(b) by 1114 days.

(21) Appl. No.: 17/587,337

(22) Filed: Jan. 28, 2022

(65) Prior Publication Data

US 2022/0154967 A1 May 19, 2022

Related U.S. Application Data

(63) Continuation of application No. PCT/CN2019/109131, filed on Sep. 29, 2019.

(30) Foreign Application Priority Data

Jul. 31, 2019 (CN) ......................... 201921239262.8

(51) Int. Cl.
*H01F 27/02* (2006.01)
*F24F 1/027* (2019.01)
(Continued)

(52) U.S. Cl.
CPC .............. *H01F 27/02* (2013.01); *F24F 11/89* (2018.01); *F24F 13/20* (2013.01); *F24F 1/027* (2013.01); *F24F 2013/207* (2013.01)

(58) Field of Classification Search
CPC .. F24F 1/027; F24F 11/89; F24F 13/20; F24F 2013/207; F24F 1/22; F24F 1/00;
(Continued)

(56) References Cited

U.S. PATENT DOCUMENTS 7,340,911 B2 * 3/2008 Ha .......................... F24F 13/20 62/262
8,320,095 B2 * 11/2012 Chang ...................... H02H 7/04 361/119

FOREIGN PATENT DOCUMENTS

CN 201476216 U 5/2010
CN 201497122 U 6/2010
(Continued)

OTHER PUBLICATIONS

International Search Report dated Apr. 24, 2020 issued in PCT/CN2019/109131.

*Primary Examiner* — Imani N Hayman
*Assistant Examiner* — Ross Terry Mularski
(74) *Attorney, Agent, or Firm* — Scully, Scott, Murphy & Presser, P.C.

(57) ABSTRACT

An electric control box assembly and a window air conditioner are disclosed. The assembly has a box body and a transformer assembly. The sidewalls of the box body are provided with a first mounting region and a second mounting region. The second mounting region is provided with a first mounting portion and a second mounting portion. When the transformer assembly is an intelligent transformer, the intelligent transformer is coupled to the first mounting portion. When the transformer assembly is a non-intelligent transformer bank, the non-intelligent transformer bank comprises a non-intelligent transformer and a relay. One of the non-intelligent transformer and the relay is mounted in the first mounting region, and the other one is coupled to the second mounting portion.

13 Claims, 4 Drawing Sheets

(51) Int. Cl.
*F24F 11/89* (2018.01)
*F24F 13/20* (2006.01)

(58) Field of Classification Search
CPC .... F24F 1/0003; F24F 1/0007; F24F 1/00073; H01F 27/00–02; H01F 27/06; H01F 2027/065; H05K 7/12
USPC .......................................................... 361/836
See application file for complete search history.

(56) References Cited

FOREIGN PATENT DOCUMENTS

| | | | | |
|---|---|---|---|---|
| CN | 203744419 | U | | 7/2014 |
| CN | 206005051 | U | | 3/2017 |
| CN | 206100695 | U | * | 4/2017 |
| CN | 206113235 | U | | 4/2017 |
| CN | 208186645 | U | | 12/2018 |
| CN | 208205351 | U | | 12/2018 |
| CN | 208955360 | U | * | 6/2019 |
| KR | 20150031770 | A | | 3/2015 |

* cited by examiner

ELECTRIC CONTROL BOX ASSEMBLY AND WINDOW AIR CONDITIONER

CROSS-REFERENCE TO RELATED APPLICATIONS

The present application is a continuation application of PCT International Application No. PCT/CN2019/109131, filed on Sep. 29, 2019, which claims priority to and the benefit of Chinese Patent Application No. 201921239262.8, field on Jul. 31, 2019, the entire contents of which are incorporated herein by reference for all purposes. No new matter has been introduced.

FIELD

The present disclosure relates to the field of air conditioning and, more particularly, to an electric control box assembly and a window air conditioner.

BACKGROUND

Box bodies of electric control boxes of air conditioners in the related art are not versatile enough and inconvenient to install.

SUMMARY

The present disclosure aims to solve at least one of the technical problems existing in the related art. To this end, an objective of the present disclosure is to provide an electric control box assembly whose box body has high versatility and can meet different usage requirements.

Another objective of the present disclosure is to provide a window air conditioner including the electric control box assembly.

The electric control box assembly according to embodiments of the present disclosure includes: a box body having a first mounting region and a second mounting region on a sidewall of the box body, the second mounting region including a first mounting portion and a second mounting portion; and a transformer assembly arranged inside the box body and including an intelligent transformer or a non-intelligent transformer bank, the non-intelligent transformer bank including a non-intelligent transformer and a relay. The intelligent transformer is coupled to the first mounting portion when the transformer assembly is the intelligent transformer. One of the non-intelligent transformer and the relay is mounted in the first mounting region, and the other of the non-intelligent transformer and the relay is coupled to the second mounting portion, when the transformer assembly is the non-intelligent transformer bank.

For the electric control box assembly according to the embodiments of the present disclosure, by providing the first mounting region and the second mounting region in the box body, and providing the first mounting portion and the second mounting portion in the second mounting region, the intelligent transformer or the non-intelligent transformer bank can be selectively mounted inside the box body according to different models and functions of the window air conditioner. Thus, it is possible to have installation locations for two kinds of transformer structures in a single box body, and make the box body highly versatile and flexible.

In some embodiments of the present disclosure, the first mounting portion includes a first mounting sub-portion and a second mounting sub-portion spaced apart from each other; the first mounting sub-portion includes a first segment and a second segment; a first end of the first segment is coupled to an inner surface of the second mounting region, and a second end of the first segment extends in a direction away from the second mounting region; a first end of the second segment is coupled to the second end of the first segment, and a second end of the second segment extends in a direction close to the second mounting sub-portion to define a slot with the inner surface of the second mounting region; and a first snap plate and a second snap plate are arranged on both ends of the intelligent transformer, the first snap plate being snapped into the slot, and the second snap plate fitting with the second mounting sub-portion.

In some embodiments of the present disclosure, the first mounting sub-portion is defined by stamping and bending a partial sidewall of the second mounting region in a direction close to an interior of the box body.

In some embodiments of the present disclosure, the first snap plate is coupled to the second segment by a first fastener.

In some embodiments of the present disclosure, the second mounting sub-portion is a mounting hole penetrating a sidewall of the box body, and the second snap plate passes through the mounting hole and abuts against an outer surface of the box body.

In some embodiments of the present disclosure, a partial sidewall of the second mounting region is recessed outwards to define a recessed portion, and a side of the recessed portion away from the first mounting sub-portion is open to define the mounting hole.

In some embodiments of the present disclosure, the electric control box assembly further includes a negative ion generator module mounted in the second mounting region.

In some embodiments of the present disclosure, the negative ion generator module is located on a side of the first mounting sub-portion away from the second mounting sub-portion; and a first end of the negative ion generator module adjacent to the first mounting sub-portion abuts against the first segment while a second end of the negative ion generator module is mounted to a fastening hole in the second mounting region via a second fastener.

In some embodiments of the present disclosure, the box body includes a first sidewall and a second sidewall connected with each other, and the first sidewall and the second sidewall are arranged perpendicularly; the first mounting region is located on the first sidewall, the second mounting region is located on the second sidewall, and the negative ion generator module is located at an end of the second mounting region adjacent to the first mounting region and located between the first mounting portion and the first sidewall; a thickness direction of the negative ion generator module is arranged perpendicular to the first sidewall.

In some embodiments of the present disclosure, the second mounting portion includes a plurality of screw holes spaced apart from one another, and the relay is coupled to the screw holes by third fasteners.

The window air conditioner according to embodiments of the present disclosure includes a front enclosure plate; and the above electric control box assembly that is mounted on the front enclosure plate.

For the window air conditioner according to the embodiments of the present disclosure, by providing the first mounting region and the second mounting region in the box body, and providing the first mounting portion and the second mounting portion in the second mounting region, the intelligent transformer or the non-intelligent transformer bank can be selectively mounted inside the box body according to different models and functions of the window air conditioner, when the electric control box assembly is applied to the window air conditioner, making it possible to have installation locations for two kinds of transformer structures in a single box body, and making the box body highly versatile and flexible.

In some embodiments of the present disclosure, the electronic control box assembly is located above the front enclosure plate, and a positioning rib is arranged on a bottom surface of the box body and is positioned to a top wall of the front enclosure plate.

Additional aspects and advantages of embodiments of present disclosure will be given in part in the following descriptions, become apparent in part from the following descriptions, or be learned from the practice of the embodiments of the present disclosure.

BRIEF DESCRIPTION OF DRAWINGS

These and other aspects and advantages of embodiments of the present disclosure will become apparent and more readily appreciated from the following descriptions made with reference to the drawings, in which.

Figure 1:
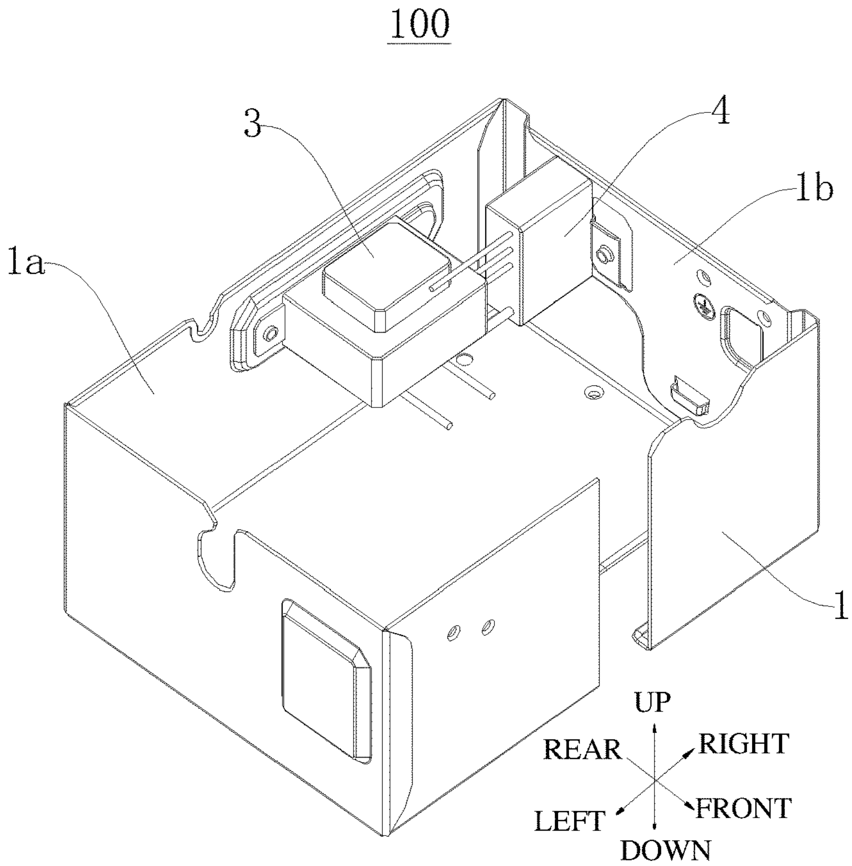
FIG. 1 is a perspective view of an electric control box assembly with a non-intelligent transformer and a negative ion generator module installed therein, according to an embodiment of the present disclosure.

Description of the reference numerals in the drawings is provided as follows:

- electric control box assembly 100;
- box body 1; first sidewall 1*a*; second sidewall 1*b*; first mounting region 11; second mounting region 12; first mounting portion 121; first mounting sub-portion 1211; first segment 121*a*; second segment 121*b*; slot 121*c*; first screw post 121*d*; second mounting sub-portion 1212; second mounting portion 122; recessed portion 123; third segment 123*a*; fourth segment 123*b*; positioning rib 13; fastening hole 124;
- intelligent transformer 2; first snap plate 21; second snap plate 22; non-intelligent transformer 3; negative ion generator module 4.

DETAILED DESCRIPTION OF EMBODIMENTS

Embodiments of the present disclosure will be described below in detail. Examples of the embodiments are illustrated in the accompanying drawings, where the same or similar reference numerals throughout the specification refer to the same or similar elements or elements having the same or similar functions. The embodiments described below with reference to the accompanying drawings are exemplary and are intended to explain the present disclosure rather than limit the present disclosure.

An electric control box assembly 100 according to embodiments of the present disclosure will be described below with reference to the accompanying drawings. The electric control box assembly 100 is mounted inside an air conditioner which may be a mobile air conditioner, a window air conditioner, or a split air conditioner (e.g., a wall-mounted air conditioner or a floor-mounted air conditioner).

Figure 2:
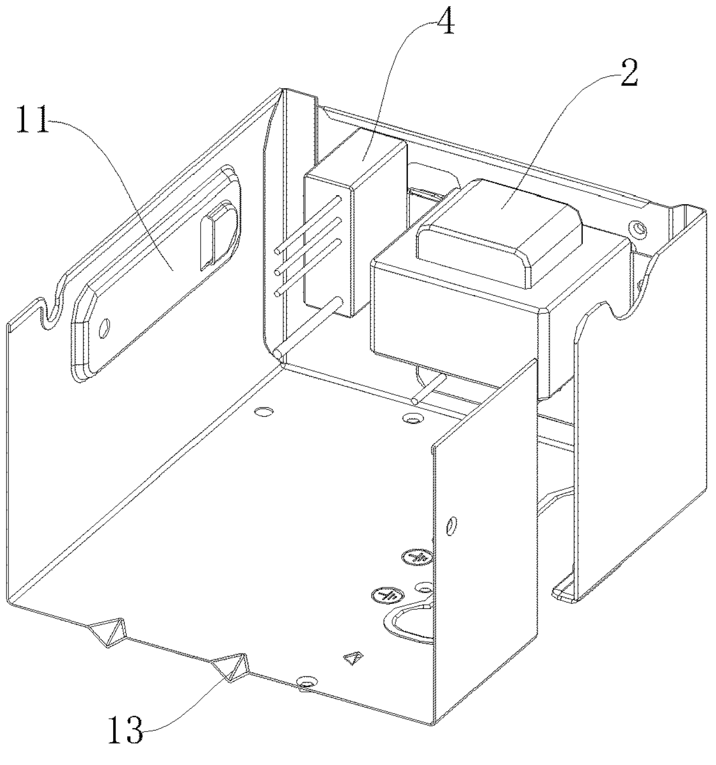
FIG. 2 is a cross-sectional perspective view of an electric control box assembly with an intelligent transformer and a negative ion generator module installed therein, according to an embodiment of the present disclosure.

As shown in FIGS. 1 and 2, the electric control box assembly 100 according to an embodiment of the present disclosure includes a box body 1 and a transformer assembly.

Figure 3:
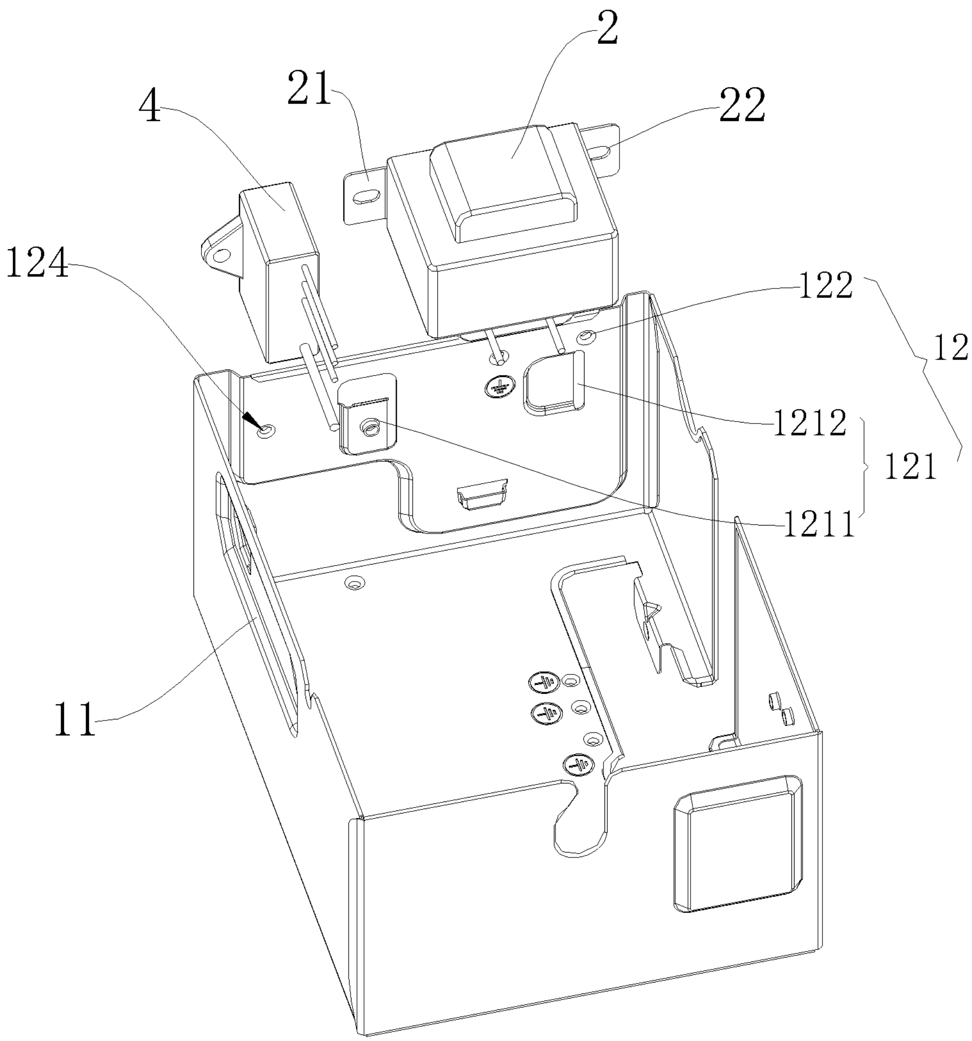
FIG. 3 is an exploded view of the electric control box assembly according to FIG. 2.

As shown in FIG. 3, the box body 1 has a first mounting region 11 and a second mounting region 12 on a sidewall of the box body, and the second mounting region 12 is provided with a first mounting portion 121 and a second mounting portion 122. The first mounting region 11 and the second mounting region 12 may be located on a common sidewall of the box body 1. Alternatively, the first mounting region 11 and the second mounting region 12 may be located on different sidewalls of the box body 1.

For example, referring to FIG. 3, the box body 1 is substantially rectangular in shape, and the box body 1 includes a front sidewall, a rear sidewall, a left sidewall, a right sidewall, and a bottom wall, with the first mounting region 11 on the rear sidewall and the second mounting region 12 on the right sidewall.

In the description of the present disclosure, it is to be understood that terms such as "upper," "lower," "front," "rear," "left," "right," "vertical," "horizontal," "inner," "outer," and the like should be construed to refer to orientations or positions as then described or as shown in the drawings under discussion. These relative terms are for convenience of description and do not indicate or imply that the device or element referred to must have a particular orientation or be constructed or operated in a particular orientation. Thus, these terms shall not be construed as limitations on the present disclosure.

As shown in FIGS. 1, 2 and 3, the transformer assembly is arranged inside the box body 1, and the transformer assembly is an intelligent transformer 2 or a non-intelligent transformer bank, in which the non-intelligent transformer bank includes a non-intelligent transformer 3 and a relay. When the transformer assembly is the intelligent transformer 2, the intelligent transformer 2 is coupled to the first mounting portion 121. When the transformer assembly is the non-intelligent transformer bank, one of the non-intelligent transformer 3 and the relay is mounted in the first mounting region 11, and the other of the non-intelligent transformer 3 and the relay is coupled to the second mounting portion 122, i.e., when the non-intelligent transformer 3 is mounted in the first mounting region 11, the relay is mounted in the second mounting portion 122 of the second mounting region 12, and when the relay is mounted in the first mounting region 11, the non-intelligent transformer 3 is mounted in the second mounting portion 122 of the second mounting region 12.

For example, a relay module is generally integrated inside the intelligent transformer 2, so when the intelligent transformer 2 is mounted inside the box body 1, there is no need to mount any relay. The intelligent transformer 2, in addition to basic components of the transformer, further includes intelligent control components and related sensing, detection, transmission modules, such as Wi-Fi communication modules, so that intelligent monitoring of operation status of the transformer can be realized in cooperation with the Internet of Things technology. The non-intelligent transformer 3 can be a traditional transformer, which has a single function and generally needs to be used together with relays. When the electric control box assembly 100 is used in the window air conditioner, it is possible to choose to mount the intelligent transformer 2 or the non-intelligent transformer bank inside the box body according to different models and functions of the window air conditioner, making it possible to have installation locations for two kinds of transformer structures in a single box body 1, and allowing the box body 1 to be highly versatile and flexible.

For the electric control box assembly 100 according to the embodiment of the present disclosure, by providing the first mounting region 11 and the second mounting region 12 in the box body 1, and providing the first mounting portion 121 and the second mounting portion 122 in the second mounting region 12, the intelligent transformer 2 or the non-intelligent transformer bank can be selectively mounted inside the box body according to different models and functions of the window air conditioner, making it possible to have installation locations for two kinds of transformer structures in a single box body 1, and making the box body 1 highly versatile and flexible.

Figure 5:
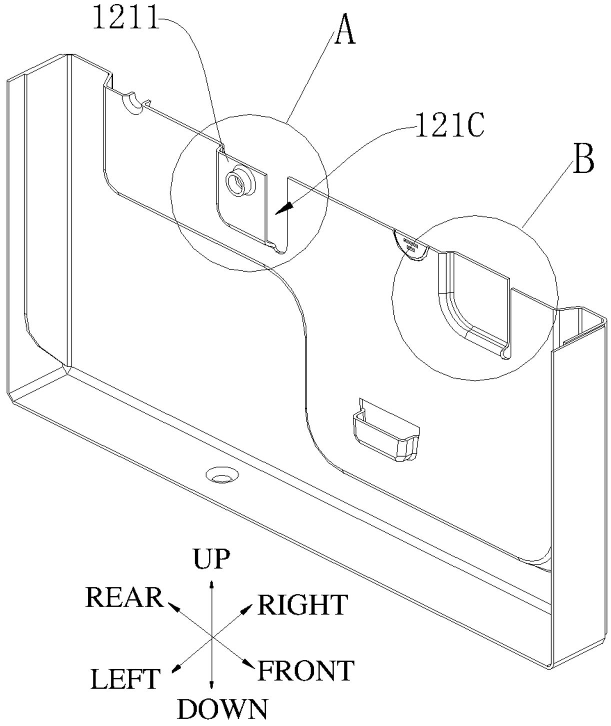
FIG. 5 is a cross-sectional perspective view of a partial structure of a box body of an electric control box assembly according to an embodiment of the present disclosure.
Figure 6:
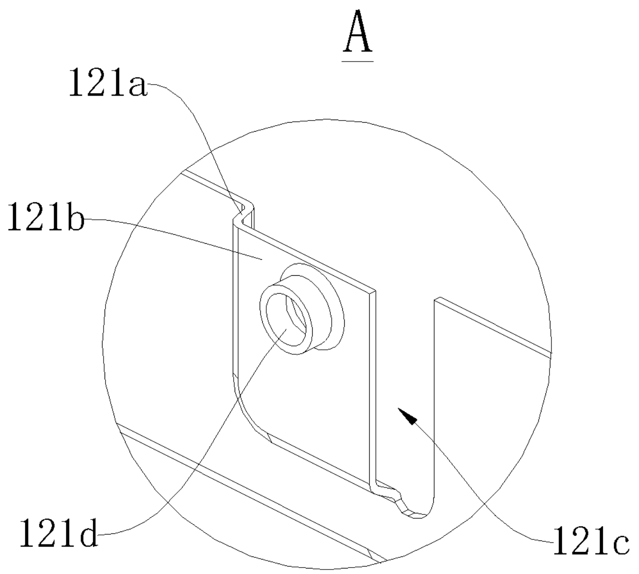
FIG. 6 is an enlarged view of a circled portion at A in FIG. 5.

In some embodiments of the present disclosure, as shown in FIGS. 3, 5 and 6, the first mounting portion 121 includes a first mounting sub-portion 1211 and a second mounting sub-portion 1212 spaced apart from each other. The first mounting sub-portion 1211 includes a first segment 121*a* and a second segment 121*b*. A first end of the first segment 121*a* is coupled to an inner surface of the second mounting region 12, and a second end of the first segment 121*a* extends in a direction away from the second mounting region 12. A first end of the second segment 121*b* is coupled to the second end of the first segment 121*a*, and a second end of the second segment 121*b* extends in a direction close to the second mounting sub-portion 1212 to define, with the inner surface of the second mounting region 12, a slot 121*c*. Both ends of the intelligent transformer 2 are provided with a first snap plate 21 and a second snap plate 22, respectively, the first snap plate 21 being adapted to snap into the slot 121*c*, and the second snap plate 22 fitting with the second mounting sub-portion 1212.

For example, referring to FIGS. 3, 5 and 6, the first mounting sub-portion 1211 and the second mounting sub-portion 1212 are arranged on the right sidewall of the box body 1 and spaced apart along a front-rear direction. The first mounting sub-portion 1211 is located behind the second mounting sub-portion 1212, and the first mounting sub-portion 1211 includes the first segment 121*a* and the second segment 121*b*. A right end of the first segment 121*a* is coupled to the inner surface of the second mounting region 12, and the first segment 121*a* extends leftwards and is arranged perpendicular to the second mounting region 12. A rear end of the second segment 121*b* coupled to a left end of the first segment 121*a*, and the second segment 121*b* extends forwards and is arranged substantially perpendicular to the first segment 121*a*. The second segment 121*b* and the inner surface of the second mounting region 12 define the slot 121*c*. The first snap plate 21 is arranged on a rear end of the intelligent transformer 2, and the second snap plate 22 is arranged on a front end of the intelligent transformer 2. The first snap plate 21 is fitted in the slot 121*c*, so that when the intelligent transformer 2 is mounted, the first snap plate 21 can be inserted into the slot 121*c*, and the second snap plate 22 can be fitted with the second mounting sub-portion 1212, making the mounting process simple and convenient.

In addition to the above implementation, it can be understood that the first mounting sub-portion 1211 and the second mounting sub-portion 1212 may also be arranged on the box body and spaced apart along other directions. For example, the first mounting sub-portion 1211 and the second mounting sub-portion 1212 can be arranged on the right sidewall of the box body 1 and spaced apart along a vertical direction.

In some embodiments of the present disclosure, the first mounting sub-portion 1211 is defined by stamping and bending a partial sidewall of the second mounting region 12 in a direction close to an interior of the box body 1, thereby simplifying the processing and reducing the production cost.

For example, referring to FIGS. 5 and 6, during actual production, a partial sidewall of the right sidewall of the box body 1 located in the second mounting region 12 is stamped and bent leftwards in the direction close to the interior of the box body 1, forming the first segment 121*a* and the second segment 121*b*, perpendicular to the first segment 121*a*, of the first mounting sub-portion 1211, and also forming the slot 121*c* between the second segment 121*b* and a partial sidewall of the second mounting region 12. Thus, the processing can be facilitated, and the first mounting sub-portion 1211 and the right sidewall of the box body 1 are one-piece, which enhances the structural strength of the two and makes them less likely to be deformed and damaged when in use.

In some embodiments of the present disclosure, the first snap plate 21 is coupled to the second segment 121*b* by a first fastener.

For example, referring to FIG. 6, the first fastener is a screw; the first snap plate 21 is provided with a first through-hole; the second segment 121*b* is provided with a first screw post 121*d* on its inner surface; and the first screw post 121*d* is provided with a first threaded hole. When the first snap plate 21 is inserted in the slot 121*c*, the first through-hole is aligned with the first threaded hole, and subsequently the screw passes through the first through-hole and is threaded into the first threaded hole, to couple the first snap plate 21 and the second segment 121*b* reliably and easily. The first screw post 121*d* may also be arranged on an outer surface of the second segment 121*b*, which will not be limited in this embodiment.

Figure 7:
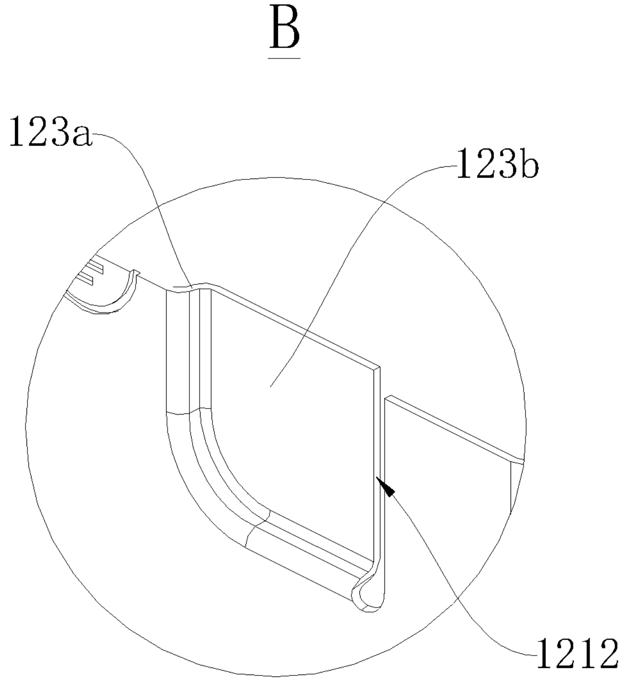
FIG. 7 is an enlarged view of a circled portion at B in FIG. 6.

In some embodiments of the present disclosure, as shown in FIGS. 3 and 7, the second mounting sub-portion 1212 is a mounting hole penetrating a sidewall of the box body 1, and the second snap plate 22 is configured to pass through the mounting hole and subsequently abut against an outer surface of the box body 1, thereby resulting in a simple structure and easy installation.

For example, referring to FIG. 7, the second mounting sub-portion 1212 is a mounting hole penetrating the right sidewall of the box body 1; the mounting hole is a vertical strip-shaped hole; and an opening shape of the mounting hole matches a shape of the second snap plate 22 of the intelligent transformer 2, so that the second snap plate 22 can be inserted into the mounting hole during installation of the intelligent transformer 2, and the entire installation process is simple and convenient.

Figure 4:
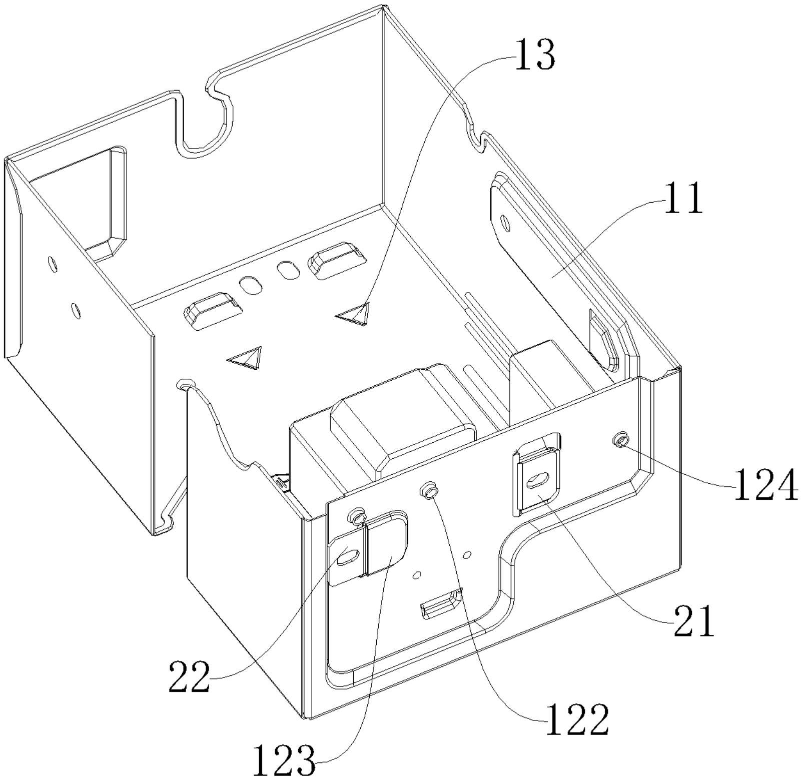
FIG. 4 is a schematic view, from another direction, of an electric control box assembly with an intelligent transformer and a negative ion generator module installed therein, according to an embodiment of the present disclosure.

In some embodiments of the present disclosure, as shown in FIG. 4, a partial sidewall of the second mounting region 12 is recessed outwards to define a recessed portion 123, and a side of the recessed portion 123 away from the first mounting sub-portion 1211 is open to define the mounting hole.

For example, referring to FIG. 7, the recessed portion 123 includes a third segment 123*a* and a fourth segment 123*b*. A left end of the third segment 123*a* is coupled to the outer surface of the second mounting region 12, and the third segment 123*a* extends rightwards. The fourth segment 123*b* is located outside the box body 1, and a rear end of the fourth segment 123*b* is coupled to a right end of the third segment 123*a*. The fourth segment 123*b* extends forwards, and a front end of the fourth segment 123*b* is open, so that the mounting hole is defined between the fourth segment 123*b* and the right sidewall of the box body 1, thereby facilitating installation. Moreover, the arrangement of the recessed portion 123 enhances the structural strength of the partial sidewall of the second mounting region 12, making it less likely to be deformed and damaged during use.

According to some embodiments of the present disclosure, the first mounting sub-portion 1211 and the second mounting sub-portion 1212 may also have the same structural form. For example, the first mounting sub-portion 1211 and the second mounting sub-portion 1212 are both constructed in the form of mounting holes. Alternatively, the second mounting sub-portion 1212 is constructed in the same structural form as the first mounting sub-portion 1211, i.e., having the slot 121*c*, in which the slot of the second mounting sub-portion 1212 is adapted to the second snap plate 22 of the intelligent transformer 2, and an opening of the slot of the second mounting sub-portion 1212 is oriented opposite to an opening of the slot 121*c* of the first mounting sub-portion 1211, so that the first snap plate 21 of the intelligent transformer 2 is inserted into the slot 121*c* of the first mounting sub-portion 1211 and the second snap plate 22 is inserted into the slot 121*c* of the second mounting sub-portion 1212.

In some embodiments of the present disclosure, as shown in FIGS. 3 and 4, the electric control box assembly 100 also includes a negative ion generator module 4 mounted in the second mounting region 12. The negative ion generator module 4 is used to generate negative air ions to improve the comfort of using the air conditioner.

In some embodiments of the present disclosure, as shown in FIGS. 3 and 4, the negative ion generator module 4 is located on a side of the first mounting sub-portion 1211 away from the second mounting sub-portion 1212; and a first end of the negative ion generator module 4 adjacent to the first mounting sub-portion 1211 abuts against the first segment 121*a*, and a second end of the negative ion generator module 4 is mounted to a fastening hole 124 in the second mounting region 12 via a second fastener.

For example, referring to FIGS. 3 and 4, the side of the first mounting sub-portion 1211 away from the second mounting sub-portion 1212 is a rear side of the first mounting sub-portion 1211 shown in drawings, and the negative ion generator module 4 is mounted on the rear side of the first mounting sub-portion 1211. Since the first segment 121*a* of the first mounting sub-portion 1211 extends toward the interior of the box body 1, the first segment 121*a* protrudes from the inner surface of the second mounting region 12. During installation of the negative ion generator module 4, a front end of the negative ion generator module 4 can abut against the first segment 121*a*, and a rear end of the negative ion generator module 4 is mounted to the fastening hole 124 via the second fastener, which makes the structure simple and the installation convenient.

Optionally, the second fastener is a screw. For example, referring to FIG. 3, the rear end of the negative ion generator module 4 is provided with a second through hole, and the fastening hole 124 in the second mounting region 12 is a threaded hole. During installation, the screw passes through the second through hole and is threaded into the threaded hole to secure the negative ion generator module 4.

In some embodiments of the present disclosure, as shown in FIGS. 1 and 3, the box body 1 includes a first sidewall 1*a* and a second sidewall 1*b* connected with each other, and the first sidewall 1*a* and the second sidewall 1*b* are arranged perpendicularly. The first mounting region 11 is located on the first sidewall 1*a*, the second mounting region 12 is located on the second sidewall 1*b*, and the negative ion generator module 4 is located at an end of the second mounting region 12 adjacent to the first mounting region 11 and located between the first mounting portion 121 and the first sidewall 1*a*. A thickness direction of the negative ion generator module 4 is arranged perpendicular to the first sidewall 1*a*. Thus, the structure is compact.

For example, referring to FIGS. 1 and 3, the first sidewall 1*a* is the rear sidewall of the box body 1, the second sidewall 1*b* is the right sidewall of the box body 1, and the right sidewall of the box body 1 is perpendicularly coupled to the rear sidewall thereof. The rear sidewall has the first mounting region 11, and the right sidewall has the second mounting region 12. The negative ion generator module 4 is located at the rear end of the second mounting region 12 and located between the first mounting portion 121 and the rear sidewall. The thickness direction of the negative ion generator module 4 is the front-rear direction as illustrated.

In some embodiments of the present disclosure, the second mounting portion 122 includes a plurality of screw holes spaced apart from one another, and the relay is coupled to the screw holes by third fasteners. For example, referring to FIG. 3, the second mounting portion 122 is arranged on the right sidewall of the box body 1, the second mounting portion 122 includes a plurality of spaced screw holes, and the relay can be coupled to the screw holes by third fasteners such as screws during installation, which makes the structure simple and the installation convenient. In the description of the present disclosure, the term "a plurality of" means two or more than two.

It should be noted that although the second mounting portion 122 and the first mounting portion 121 are both located on the right sidewall of the box body 1, they do not interfere each other, i.e., the installation of the intelligent transformer 2 and that of the relay do not influence each other, and users may selectively mount them during actual use according to their own needs.

A window air conditioner according to embodiments of the present disclosure includes a front enclosure plate and an electric control box assembly 100 that is the above-mentioned electric control box assembly 100 and is located on the front enclosure plate.

For the window air conditioner according to the embodiments of the present disclosure, by providing the first mounting region 11 and the second mounting region 12 in the box body 1, and providing the first mounting portion 121 and the second mounting portion 122 in the second mounting region 12, the intelligent transformer 2 or the non-intelligent transformer bank can be selectively mounted inside the box body according to different models and functions of the window air conditioner, when the electric control box assembly is applied to the window air conditioner, making it possible to have installation locations for two kinds of transformer structures in a single box body 1, and making the box body 1 highly versatile and flexible.

In some embodiments of the present disclosure, the electronic control box assembly 100 is located above the front enclosure plate, and a positioning rib 13 is arranged on a bottom surface of the box body 1 and is adapted to be positioned to a top wall of the front enclosure plate.

For example, referring to FIGS. 2 and 4, the positioning rib 13 is a triangular rib, and the positioning rib 13 protrudes downwards beyond a bottom wall of the box body 1, so that during the installation of the electric control box assembly 100, the positioning rib 13 can abut against the top wall of the front enclosure plate of the window air conditioner to facilitate the installation.

Other structures of the window air conditioner are well known to those skilled in the art and will not be described in detail here.

In the description of the present disclosure, expressions such as "first feature" and "second feature" may include one or more of this feature. In addition, terms such as "first" and "second" are used herein for purposes of description and are not intended to indicate or imply relative importance or significance or to imply the number of indicated technical features. Thus, the feature defined with "first" and "second" may explicitly or implicitly include one or more of this feature.

In the present disclosure, unless specified or limited otherwise, the terms "mounted," "connected," "coupled," "fixed" and the like are used broadly, and may be, for example, fixed connections, detachable connections, or integral connections; may also be direct connections or indirect connections via intervening structures; may also be inner communication or mutual interaction of two elements, which can be understood by those skilled in the art according to specific situations.

Reference throughout this specification to "some embodiments," "an optional embodiment" and the like means that a particular feature, structure, material, or characteristic described in connection with the embodiment or example is included in at least one embodiment or example of the present disclosure. Thus, the appearances of the phrases throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and described, it would be appreciated by those skilled in the art that changes, modifications, alternatives, and variations can be made in the embodiments without departing from principles and purposes of the present disclosure.

What is claimed is:

1. An electric control box assembly comprising:

a box body comprising a first mounting region and a second mounting region on a sidewall of the box body, the second mounting region comprising a first mounting portion and a second mounting portion; and a transformer assembly arranged inside the box body, wherein:

the first mounting portion comprises a first mounting sub-portion and a second mounting sub-portion spaced apart from each other;

the first mounting sub-portion comprises a first segment and a second segment;

a first end of the first segment is coupled to an inner surface of the second mounting region, and a second end of the first segment extends in a direction away from the second mounting region;

a first end of the second segment is coupled to the second end of the first segment, and a second end of the second segment extends in a direction close to the second mounting sub-portion to define a slot with the inner surface of the second mounting region; and a first snap plate and a second snap plate are arranged on both ends of the transformer assembly, the first snap plate being snapped into the slot, and the second snap plate fitting with the second mounting sub-portion.

2. The electric control box assembly according to claim 1, wherein:

the transformer assembly comprises an intelligent transformer; and the intelligent transformer is coupled to the first mounting portion.

3. The electric control box assembly according to claim 1, wherein:

the transformer assembly comprises a non-intelligent transformer bank, the non-intelligent transformer bank comprising a non-intelligent transformer and a relay; and one of the non-intelligent transformer and the relay is mounted in the first mounting region, and the other of the non-intelligent transformer and the relay is coupled to the second mounting portion.

4. The electric control box assembly according to claim 1, wherein the first mounting sub-portion is defined by stamping and bending a partial sidewall of the second mounting region in a direction close to an interior of the box body.

5. The electric control box assembly according to claim 1, wherein the first snap plate is coupled to the second segment by a first fastener.

6. The electric control box assembly according to claim 1, wherein the second mounting sub-portion is a mounting hole penetrating a sidewall of the box body, and the second snap plate passes through the mounting hole and abuts against an outer surface of the box body.

7. The electric control box assembly according to claim 6, wherein a partial sidewall of the second mounting region is recessed outwards to define a recessed portion, and a side of the recessed portion away from the first mounting sub-portion is open to define the mounting hole.

8. The electric control box assembly according to claim 1, further comprising a negative ion generator module mounted in the second mounting region.

9. The electric control box assembly according to claim 8, wherein the negative ion generator module is located on a side of the first mounting sub-portion away from the second mounting sub-portion; and a first end of the negative ion generator module adjacent to the first mounting sub-portion abuts against the first segment while a second end of the negative ion generator module is mounted to a fastening hole in the second mounting region via a second fastener.

10. The electric control box assembly according to claim 9, wherein:

the box body comprises a first sidewall and a second sidewall connected with each other, and the first sidewall and the second sidewall are arranged perpendicularly;

the first mounting region is located on the first sidewall, the second mounting region is located on the second sidewall, and the negative ion generator module is located at an end of the second mounting region adjacent to the first mounting region and located between the first mounting portion and the first sidewall;

a thickness direction of the negative ion generator module is arranged perpendicular to the first sidewall.

11. The electric control box assembly according to claim 1, wherein the second mounting portion comprises a plurality of screw holes spaced apart from one another, and a relay is coupled to the screw holes by third fasteners.

12. A window air conditioner comprising:

a front enclosure plate; and the electric control box assembly according to claim 1, the electric control box assembly being mounted on the front enclosure plate.

13. The window air conditioner according to claim 12, wherein the electric control box assembly is located above the front enclosure plate, and a positioning rib is arranged on a bottom surface of the box body and is positioned to a top wall of the front enclosure plate.

* * * * *